United States Patent
Whiteman

(10) Patent No.: US 9,409,803 B2
(45) Date of Patent: Aug. 9, 2016

(54) SYSTEMS AND METHODS FOR REDUCING SLUDGES PRODUCED BY WASTEWATER TREATMENT FACILITIES

(76) Inventor: Robert Whiteman, Fleming Island, FL (US)

( * ) Notice: Subject to any disclaimer, the term of this patent is extended or adjusted under 35 U.S.C. 154(b) by 375 days.

(21) Appl. No.: 12/696,919

(22) Filed: Jan. 29, 2010

(65) Prior Publication Data

US 2011/0186510 A1    Aug. 4, 2011

(51) Int. Cl.
*C02F 3/00*      (2006.01)

(52) U.S. Cl.
CPC .................................. *C02F 3/00* (2013.01)

(58) Field of Classification Search
CPC .......................................................... C02F 3/00
See application file for complete search history.

(56) References Cited

U.S. PATENT DOCUMENTS

| | | |
|---|---|---|
| 2002/0117445 A1 | 8/2002 | Whiteman |
| 2003/0190742 A1 | 10/2003 | Whiteman |
| 2008/0210610 A1 | 9/2008 | Whiteman |
| 2008/0210630 A1 | 9/2008 | Whiteman |
| 2008/0277338 A1 | 11/2008 | Whiteman |
| 2009/0039015 A1 | 2/2009 | Baba et al. |
| 2010/0089824 A1 | 4/2010 | Whiteman |
| 2010/0089826 A1 | 4/2010 | Whiteman |
| 2010/0096323 A1 | 4/2010 | Whiteman |
| 2010/0193430 A1 | 8/2010 | Whiteman |

FOREIGN PATENT DOCUMENTS

WO    WO 01/44119 A1    6/2001

OTHER PUBLICATIONS

Operation of Wastewater Treatment Plants Manuals, A Field Study Training Program, 4th Edition, vol. 1 and 2, California State University, Sacramento, 1993.
Industrial Waste Treatment, A Field Study Training Program, California State University, Sacramento, 1991.
Advanced Waste Treatment, A Field Study Training Program, Second Edition, California State University, Sacramento, 1993.
Operation and Maintenance Wastewater Collection Systems, A Field Study Training Program, Fourth Edition, vols. 1 and 2, California State University, Sacramento, 1993.
Whiteman GR, TAPPI Environmental Conference—"The Application of Selected Microbial Formulations in the Pulp and Paper Industry," TAPPI Environmental Proceedings, Book 1, pp. 235-238, Apr. 1991.
Whiteman GR, Gwinnett Industrial Conference—"Optimizing Biological Processes—A Look Inside the Black Box," Apr. 1995.

(Continued)

*Primary Examiner* — Chester Barry
(74) *Attorney, Agent, or Firm* — Lawrence J. Gibney, Jr.; Mitchell R. Ghaneie

(57) ABSTRACT

The invention relates to methods and systems of improving sludge removal and maintaining effluent quality. The methods include directing an incoming wastewater stream to a treatment facility, the steam having a flow of at least 20,000 gallons per day; the incoming wastewater stream having at least 50 mg/L solids and 100 mg/L BOD; removing solids and BOD from the incoming wastewater stream in the treatment facility to provide a final effluent stream; the final effluent stream having less than 10% of the solids of the wastewater stream and less than 10% of the BOD of the wastewater stream; the removal of solids and BOD yielding less than about 0.25 pounds of secondary sludge per pound of BOD removed.

46 Claims, 3 Drawing Sheets

(56) References Cited

OTHER PUBLICATIONS

Whiteman GR, TAPPI Environmental Conference—"Improving Treatment Performance with Natural Bioaugmentation", TAPPI Environmental Proceedings, Vancouver, BC, 1998.

Lehninger AL, Biochemistry, Second Edition, Worth Publishers Inc., 1975.

Levy et al., Introductory Microbiology, John Wiley & Sons Inc., 1973.

Inventor's activity through Advanced Biological Services at City of Gray, Aug. 2008.

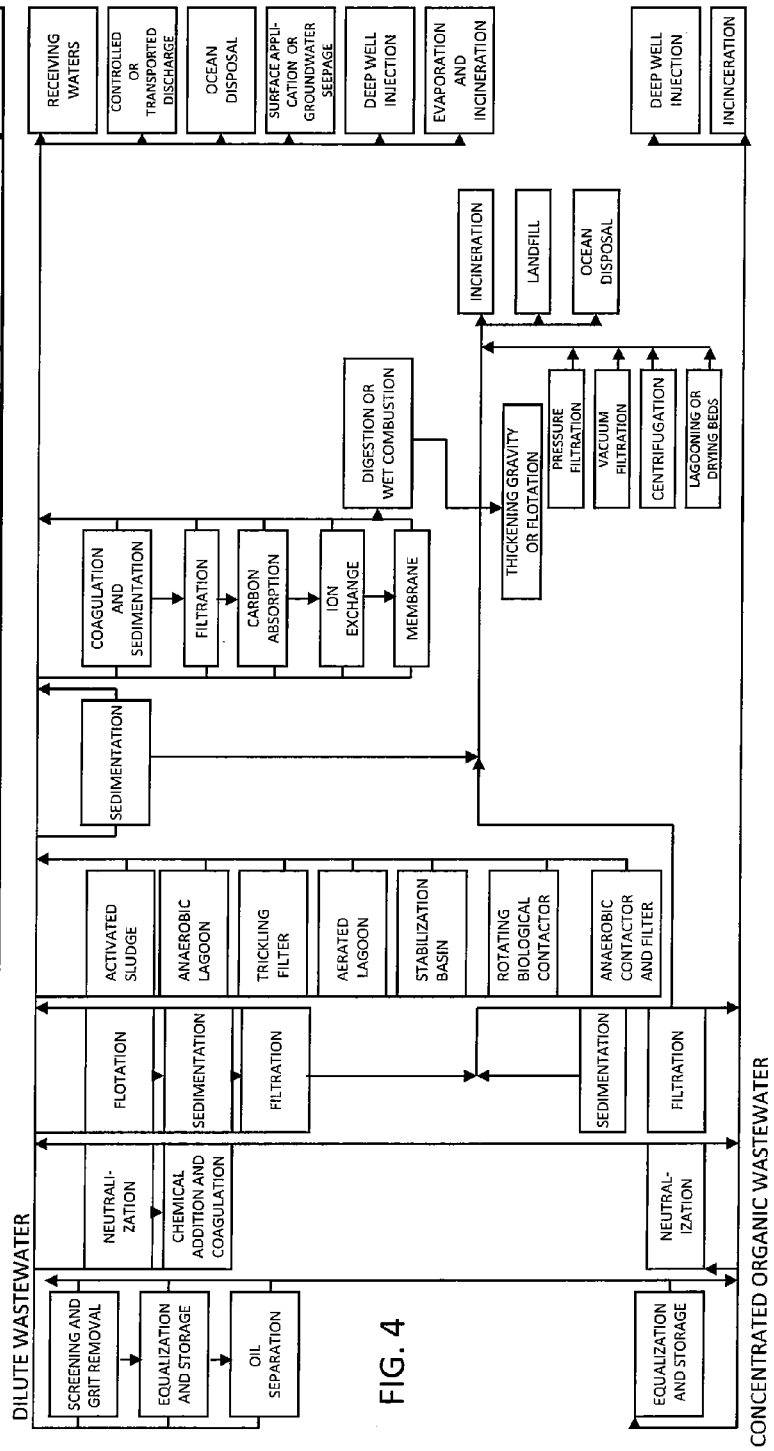

SYSTEMS AND METHODS FOR REDUCING SLUDGES PRODUCED BY WASTEWATER TREATMENT FACILITIES

BACKGROUND

Wastewater generated by municipalities and industries water is commonly collected and routed to a treatment facility for the removal of a variety of physical, chemical and biological pollutants prior to being discharged into a receiving body of water. To effect the necessary treatment, many public and private treatment facilities employ both physical and biological treatment methods. Physical methods—including screening, grinding and physical settling processes—are effective for the removal of larger and heavier solids in the wastewater. However, lighter, smaller solids and other soluble pollutants in the wastewater resist removal by physical methods. For these pollutants, biological treatment methods such as activated sludge and trickling filters are commonly employed.

Regulation of pollutant discharges from municipal wastewater treatment systems has become more stringent in recent years. In response, many municipalities have deployed new wastewater treatment systems or retrofitted existing systems to reduce pollutant discharge. Pollutants can be many forms with the most common being Biochemical Oxygen Demand (BOD), Chemical Oxygen Demand (COD), Total Suspended Solids (TSS), ammonia, total nitrogen, nitrate, nitrite and phosphorous.

Biological treatment systems, such as conventional activated sludge systems and membrane bioreactors are one method to reduce the pollutants in a wastewater influent. The term "influent" refers to wastewater or other liquid—raw (untreated) or partially treated—flowing into a reservoir, basin, treatment process or treatment plant or treatment facility. Biological treatment systems are designed and operated to retain an adequate amount of activated sludge such that the pollutant load contained in the water treated by the system will be adequately reduced. The net amount defined as weight or mass of waste activated sludge produced is related to the Solids Retention Time (SRT) of the system. The minimum SRT required to treat various pollutants under various conditions is generally well known. Conventional activated sludge systems retain activated sludge by the use of settling or clarification devices and can maintain adequate SRTs to treat pollutants provided that the flow of the activated sludge concentration and settleability of the activated sludge going to the settling basins or clarifiers are within reasonable limits set by design parameters, which depend upon the area of the settling basins or clarifiers and the characteristics of the activated sludge. Membrane bioreactor systems retain the activated sludge by the use of membrane filtration equipment and can operate successfully at significantly higher activated sludge concentrations than typical for conventional activated sludge systems, but are more limited in their ability to process occasional high flow rates.

When pollutant loading or hydraulic capacity limits are reached, treatment facilities face the risk of permit limit violations, the possibility of Federal or State enforcement action, and restrictions or prohibitions on domestic and industrial growth within the collection system service area of the treatment works. Typically, wastewater treatment facilities undergo physical expansion to meet the needs of increased hydraulic loading. But, physical expansion is expensive and often requires additional land that may not be available adjacent to existing facilities, particularly in large cities where land is more expansive.

Therefore, it is desirable to find a way to increase volumetric or mass pollutant loading and hydraulic capacity without the need for physical plant expansion. A significant advantage of the present invention over prior art methods of sludge processes is that volumetric pollutant loading can be substantially increased with addition of the Biofermentor to existing physical facilities. In addition, it is also a feature and advantage of the present invention that the enhanced sludge process produces a biological sludge with improved settling characteristics. Improved settling characteristics allow increases in hydraulic loading without requiring an increase in the size of the physical elements of the activated sludge system because the net sludge wastage and/or production is lower. Another advantage is a reduction in operating costs, such as chemicals, manpower, energy, and transportation because there is less biological sludge to be handled in the sludge handling processes and disposed of, which typically represents 40-50% of the operating costs of wastewater treatment facility. By the same token, a new wastewater operating costs of a wastewater treatment facility. By the same token, new wastewater treatment plants can be constructed in smaller sizes, with much reduced need for sludge handling facilities and hence at lower capital costs than known systems. For existing wastewater treatment systems requiring upgrades it may be possible to eliminate the need for capital expansion or delay parts or all of the expansion. Additionally, the time between wasting biological sludge may be extended from the activated sludge process to an aerobic or anaerobic digester by 25-50%, and from that process by 25-50% to the dewatering step, such as drying bed, filter press or centrifuge. This additional time means less manpower requirements, less equipment, less power usage and less chemical usage.

SUMMARY

The invention relates to a method of improving sludge removal and maintaining effluent quality. The method includes directing an incoming wastewater stream to a treatment facility, the stream having a flow of at least 20,000 gallons per day; the incoming wastewater stream having at least 50 mg/L solids and 100 mg/L BOD; removing solids and BOD from the incoming wastewater stream in the treatment facility to provide a final effluent stream; the final effluent stream having less than 10% of the solids of the wastewater stream and less than 10% of the BOD of the wastewater stream; the removal of solids and BOD yielding less than about 0.25 pounds of secondary sludge per pound of BOD removed. In the method, the incoming wastewater stream may have at least about 100 mg/L solids and 200 mg/L BOD and the removed solid may be less than about 0.25 pounds of secondary sludge per pound of BOD removed. In the method, the incoming wastewater stream may have at least about 100 mg/L solids and 400 mg/L BOD and the removed solid may be less than about 0.25 pounds of secondary sludge per pound of BOD removed. In the method, the incoming wastewater stream may have at least about 50 mg/L solids and 100 mg/L BOD and the removed solid may be less than about 0.125 pounds of secondary sludge per pound of BOD removed. In the method, the incoming wastewater stream may have at least about 100 mg/L solids and 200 mg/L BOD and the removed solid may be less than about 0.125 pounds of secondary sludge per pound of BOD removed.

In another embodiment, the invention relates to a method of improving sludge removal and maintaining effluent quality. The method includes directing an incoming wastewater stream to a treatment facility, the stream having a flow of at least 20,000 gallons per day; the incoming wastewater stream having at least 50 mg/L solids and 100 mg/L BOD; removing solids and BOD from the incoming wastewater stream in the treatment facility to provide a final effluent stream; the final effluent stream having less than 10% of the solids of the wastewater stream and less than 10% of the BOD of the wastewater stream; the removal of solids and BOD yielding less than about 0.25 pounds of biological sludge per pound of BOD removed. In the method, the incoming wastewater stream may have at least about 100 mg/L solids and 200 mg/L BOD and the removed solid may be less than about 0.25 pounds of biological sludge per pound of BOD removed. In the method, the incoming wastewater stream may have at least about 100 mg/L solids and 400 mg/L BOD and the removed solid may be less than about 0.25 pounds of biological sludge per pound of BOD removed. In the method, the incoming wastewater stream may have at least about 50 mg/L solids and 100 mg/L BOD and the removed solid may be less than about 0.125 pounds of biological sludge per pound of BOD removed. In the method, the incoming wastewater stream may have at least about 100 mg/L solids and 200 mg/L BOD and the removed solid may be less than about 0.125 pounds of biological sludge per pound of BOD removed.

In another embodiment, the invention relates to a method of improving sludge removal and maintaining effluent quality. The method includes directing an incoming wastewater stream to a treatment facility, the stream having a flow of at least 20,000 gallons per day; the incoming wastewater stream having at least 50 mg/L solids and 100 mg/L BOD; removing solids and BOD from the incoming wastewater stream in the treatment facility to provide a first final effluent stream; the first final effluent stream having less than 10% of the solids of the wastewater stream and less than 10% of the BOD of the wastewater stream; treating the wastewater stream by addition of a treatment batch from a biofermentor, whereby the pounds of sludge removed is reduced by at least about 10% without increasing the solids and BOD in the final effluent stream. In the method, the treatment batch may be added to anaerobic digester, equalization basin and/or primary clarifier. In the method, the pounds of sludge removed may be reduced by at least 25% without increasing the solids and BOD in the final effluent stream. In the method, the pounds of sludge removed may be reduced by at least about 50% without increasing the solids and BOD in the final effluent stream.

In yet another embodiment, the invention relates to a method of improving sludge removal and maintaining effluent quality. The method includes directing an incoming wastewater stream to a treatment facility, the stream having a flow of at least 20,000 gallons per day; the incoming wastewater stream having at least 50 mg/L biological solids and 100 mg/L BOD; removing biological solids and BOD from the incoming wastewater stream in the treatment facility to provide a final effluent stream; the final effluent stream having less than 10% of the biological solids of the wastewater stream and less than 10% of the BOD of the wastewater stream; the removal of solids and BOD yielding less than about 0.25 pounds of biological solids per pound of BOD removed. In the method, the sludge may be a primary sludge, a biological sludge and or the sludge may comprise a primary sludge and a biological sludge. In the method, the incoming wastewater stream may have at least about 100 mg/L solids and 200 mg/L BOD and the removed solid may be less than about 0.25 pounds of biological solids per pound of BOD removed. In the method, the incoming wastewater stream may have at least about 100 mg/L solids and 400 mg/L BOD and the removed solid may be less than about 0.25 pounds of biological solids per pound of BOD removed. In the method, the incoming wastewater stream may have at least about 50 mg/L solids and 100 mg/L BOD and the removed solid is less than about 0.125 pounds of biological solids per pound of BOD removed. In the method, the incoming wastewater stream may have at least about 100 mg/L solids and 200 mg/L BOD and the removed solid may be less than about 0.125 pounds of biological solids per pound of BOD removed.

In further embodiment, the invention relates to a method of improving sludge removal and maintaining effluent quality. The method includes directing and incoming wastewater stream to a treatment facility, the stream having a flow of at least 20,000 gallons per day; the incoming wastewater stream having at least 50 mg/L solids or 100 mg/L BOD; removing solids and BOD from the incoming wastewater stream in the treatment facility to provide a final effluent stream; the final effluent stream having less than 10% of the solids of the wastewater stream and less than 10% of the BOD of the wastewater stream; the removal of solids and BOD yielding less than about 0.25 pounds of secondary sludge per pound of BOD removed. In the method, the incoming wastewater stream may have at least about 100 mg/L solids and 200 mg/L BOD and the removed solid may be less than about 0.25 pounds of secondary sludge per pound of BOD removed. In the method the incoming wastewater stream may have at least about 100 mg/L solids and 400 mg/L BOD and the removed solid may be less than about 0.25 pounds of secondary sludge per pound of BOD removed. In the method, the incoming wastewater stream may have at least about 50 mg/L solids and 100 mg/L BOD and the removed solid may be less than about 0.125 pounds of secondary sludge per pound of BOD removed. In the method, the incoming wastewater stream may have at least about 100 mg/L solids and 200 mg/L BOD and the removed solid may be less than about 0.125 pounds of secondary sludge per pound of BOD removed.

In yet another embodiment, the invention relates to a method of improving sludge removal and maintaining effluent quality. The method includes directing an incoming wastewater stream to a treatment facility, the stream having a flow of at least 20,000 gallons per day; the incoming wastewater stream having at least 50 mg/L solids or 100 mg/L BOD; removing solids and BOD from the incoming wastewater stream in the treatment facility to provide a final effluent stream; the final effluent stream having less than 10% of the solids of the wastewater stream and less than 10% of the BOD of the wastewater stream; the removal of solids and BOD yielding less than about 0.25 pounds of biological sludge per pound of BOD removed. In the method, the incoming wastewater stream may have at least about 100 mg/L solids and 200 mg/L BOD and the removed solid may be less than about 0.25 pounds of biological sludge per pound of BOD removed. IN the method, the incoming wastewater stream may have at least about 100 mg/L solids and 400 mg/L BOD and the removed solid may be less than about 0.25 pounds of biological sludge per pound of BOD removed. In the method, the incoming wastewater stream may have at least about 50 mg/L solids and 100 mg/L BOD and the removed solid may be less than about 0.125 pounds of biological sludge per pound of BOD removed. In the method, the incoming wastewater stream may have at least about 100 mg/L solids and 200 mg/L BOD and the removed solid may be less than about 0.125 pounds of biological sludge per pound of BOD removed.

BRIEF DESCRIPTION OF THE DRAWINGS

FIG. 3 is a diagram illustrating an exemplary wastewater treatment sequence and process.

FIG. 4 is a diagram illustrating an exemplary wastewater treatment sequence and process.

DETAILED DESCRIPTION OF THE DRAWINGS AND THE PRESENTLY PREFERRED EMBODIMENTS

Figure 1:
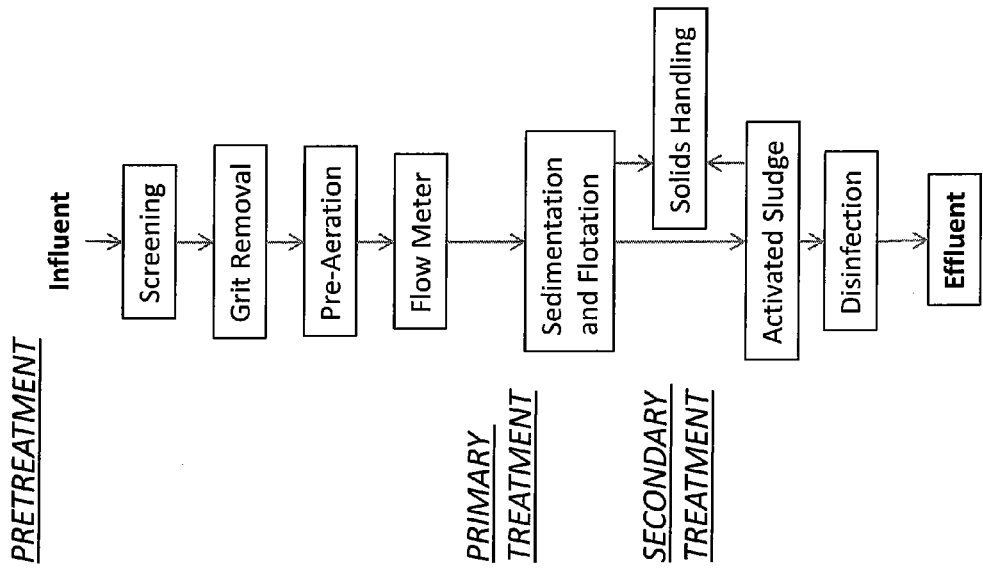
FIG. 1 is a flow diagram of conventional activated sludge process.

Various embodiments of the present invention provides systems and methods for treating wastewater. Many embodiments of the invention are capable of receiving an influent that exceeds one or more environmental standards and discharging and effluent that meets current environmental standards, including limitations on BOD, COD, TSS, ammonia, nitrate, nitrite, total nitrogen and phosphorus levels. Such environmental standards for discharge are controlled under or by the National Pollutant Discharge Elimination System (NPDES). Aspects of the invention may be selected to maximize treatment efficacy and minimize operational costs during "normal" operation, yet yield acceptable discharge quality with the same system even during high input periods.

Specifically, the present invention relates to a wastewater treatment method, in which the net biological sludge wasted or produced is reduced.

Overview

The practice of the present invention employs, unless otherwise indicated, conventional techniques of wastewater treatment technologies, which are within the ordinary skill of the art of a Class 1 or Class A certified operator or a degreed Environmental Engineer. Such techniques and definition of technical terms are explained fully in the literature, such as, Operation of Wastewater Treatment Plants Manuals, A Field Study Training Program, $4^{th}$ Edition, Volume 1 and 2, California State University, Sacramento, 1993; Industrial Waste Treatment, A Field Study Training Program, California State University, Sacramento, 1991; Advanced Waste Treatment, A Field Study Training Program, Second Edition, California State University, Sacramento, 1993; and Operation and Maintenance Wastewater Collection Systems, A Field Study Training Program, Fourth Edition, Volumes 1 and 2, California State University, Sacramento, 1993, for certification of operators.

Wastewater can be treated close to where it is created (in septic tanks, biofilters or aerobic treatment systems), or collected and transported via a network of pipes and pump stations referred to as a collection system to a wastewater treatment plan. Wastewater collection and treatment is typically subject to local, state and federal regulations and standards. Industrial sources of wastewater often require specialized treatment processes.

Typically, wastewater treatment involves three stages, called primary, secondary and tertiary treatments.

Primary or sedimentation treatment/stage consists of temporarily holding the influent wastewater in a quiescent basin where heavy solids can settle to the bottom while fats, oils, grease and lighter solids float to the surface. The settled and floating materials are removed and the remaining liquid may be discharged or subjected to secondary treatment.

The term "influent" refers to wastewater or other liquid—raw (untreated) or partially treated—flowing into a reservoir, basin, treatment process or treatment plant or treatment facility.

In the primary stage, wastewater flows through large tanks, commonly called "primary clarifiers" or "primary sedimentation tanks." The term "clarifier" refers to settling tank or sedimentation basin," which are tanks or basins in which wastewater is held for a period of time, during which the heavier solids settle to the bottom and the lighter material will float to the water surface. The tanks are large enough that sludge can settle and floating material such as grease and oils can rise to the surface and be skimmed off. The main purpose of the primary sedimentation stage is to produce both a generally homogeneous liquid capable of being treated biologically and a sludge that can be separately treated or processed. Primary settling tanks are usually equipped with mechanically driven scrapers that continually drive the collected sludge towards a hopper in the base of a tank from where it can be pumped to further sludge treatment stages.

The term "sludge," encompasses "primary sludge," "secondary sludge" or "biological sludge," and miscellaneously "solids", these three words are used herein interchangeably and depending on the context, refer to the excess biomass produced during secondary (biological) treatment from the biodegradation of organic matter.

The term "primary sludge" refers to a semi-liquid waste resulting from sedimentation using primary treatment, with no additional treatment. It typically, includes organics, paper, fecal matter/solids which settle and are removed from the bottom of the primary clarifier or dredged from a pretreatment or equalization basin. Primary sludge may also include secondary sludge where co-settling of secondary and primary sludge are practiced in the primary clarifiers.

Secondary treatment removes dissolved and suspended biological matter. Secondary treatment is typically performed by indigenous, water-borne micro-organisms in a managed habitat, namely the biological waste treatment system. Secondary treatment requires a separation process to remove the micro-organisms from the treated water prior to discharge or tertiary treatment.

Tertiary treatment is sometimes defined as anything more than primary and secondary treatment. Treated water is sometimes disinfected chemically or physically (for example by lagoons and microfiltration) prior to discharge into a stream, river, bay, lagoon or wetland, or it can be used for the irrigation of a golf course, green way or park. If it is sufficiently clean, it can also be used for groundwater recharge or agricultural purposes.

Generally, the influent wastewater may also be pretreated. Pre-treatment removes materials such as large objects that can be easily collected from the raw wastewater before they damage or clog the pumps and skimmers of primary treatment clarifiers. This is most commonly done with an automated mechanically raked bar screen in modern plants serving large populations, whilst in smaller or less modern plants a manually cleaned screen may be used. The raking action of a mechanical bar screen is typically paced according to the accumulation on the bar screens and/or flow rate. The solids are collected and later disposed in a landfill or incinerated.

Pre-treatment may also include a sand or grit channel or chamber where the velocity of the incoming wastewater is carefully controlled to allow sand, grit and stones to settle.

Following the tertiary treatment, the accumulated sludges must be treated and disposed of in a safe and effective manner. The purpose of digestion is to reduce the amount of organic matter and the number of disease-causing microorganisms present in the solids. The most common treatment options include anaerobic digestion, aerobic digestion, and composting. Incineration may also be used.

Choice of wastewater solid treatment method depends on the amount of solids generated and other site-specific conditions. However, in general, composting is most often applied to smaller-scale applications followed by aerobic digestion and then lastly anaerobic digestion for the larger-scale municipal applications.

Anaerobic digestion is a bacterial process that is carried out in the absence of oxygen. The process can either be thermophilic digestion, in which sludge is fermented in tanks at a temperature of 55° C., or mesophilic, at a temperature of around 36° C. Though allowing shorter retention time (and thus smaller tanks), thermophilic digestion is more expensive in terms of energy consumption for heating the sludge.

One major feature of anaerobic digestion is the production of biogas (with the most useful component being methane), which can be used in generators for electricity production and/or in boilers for heating purposes.

Aerobic digestion is a bacterial process occurring in the presence of oxygen. Under aerobic conditions, bacteria rapidly consume organic matter and convert it into carbon dioxide. The operating costs for aerobic digestion are significant because of the energy used by the blowers, pumps and motors needed to add oxygen to the process even with the recent advent of stone fibre filter technology which uses natural air currents for oxygenation. Aerobic digestion can be achieved by using jet aerators to oxidize the sludge, which is also costly but less expensive than traditional processes.

Composting is also an aerobic process that involves mixing the sludge with sources of carbon such as sawdust, straw or wood chips. In the presence of oxygen, bacteria digest both the wastewater solids and the added carbon source and, in doing so, produce a large amount of heat.

Incineration of sludge is less common due to air emissions concerns and the supplemental fuel (typically natural gas or fuel oil) required to burn the low calorific value sludge and vaporize residual water. Stepped multiple hearth incinerators with high residence time as well as fluidized bed incinerators are the most common systems used to combust wastewater sludge. Co-firing in municipal waste-to energy plants is occasionally done, this option is being less expensive assuming the facilities already exist for solid waste as well as no need for auxiliary fuel.

When a liquid sludge is produced, further treatment may be required to make it suitable for final disposal. Typically, sludges are thickened (dewatered) to reduce the volumes transported off-site for disposal. There is no process which completely eliminates the need to dispose of biosolids. There is, however, an additional step some cities are taking to superheat the wastewater sludge and convert the "cake" into small pelletized granules that are high in nitrogen and other organic materials and used as fertilizers. This product may then be sold to local farmers and turf farms as a soil amendment or fertilizer, reducing the amount of space required to dispose of sludge in landfills. The removed fluid, called centrate, is typically reintroduced into the wastewater process.

There are different types of wastewater treatment systems and processes. On example of wastewater treatment system is an activated sludge process, which is illustrated in FIG. 1 with a flow diagram. Generally, during the pretreatment step, the influent is first screened to remove roots, rags, cans and large debris, which then can be hauled to a landfill or of possible grind and returned to plant flow. Next, the sand and gravel is removed from the influent during the grit removal step and the wastewater is pre-aerated to freshen the wastewater and to help remove oil. The influent is then passed through a flow meter that measures and records the flow. Following the pretreatment, the influent is subjected to primary treatment, including sedimentation and flotation that removes settleable and floatable materials. Following the primary treatment, the wastewater enters secondary treatment (also known as biological treatment) to remove through biodegradation soluble or dissolved organics while suspended solids are removed via entrapment in the floc with some biodegradation over time. Following secondary treatment, the wastewater enters tertiary treatment where the wastewater is disinfected to kill pathogenic organisms, and usually re-aerated prior to discharge of the effluent.

Figure 2:
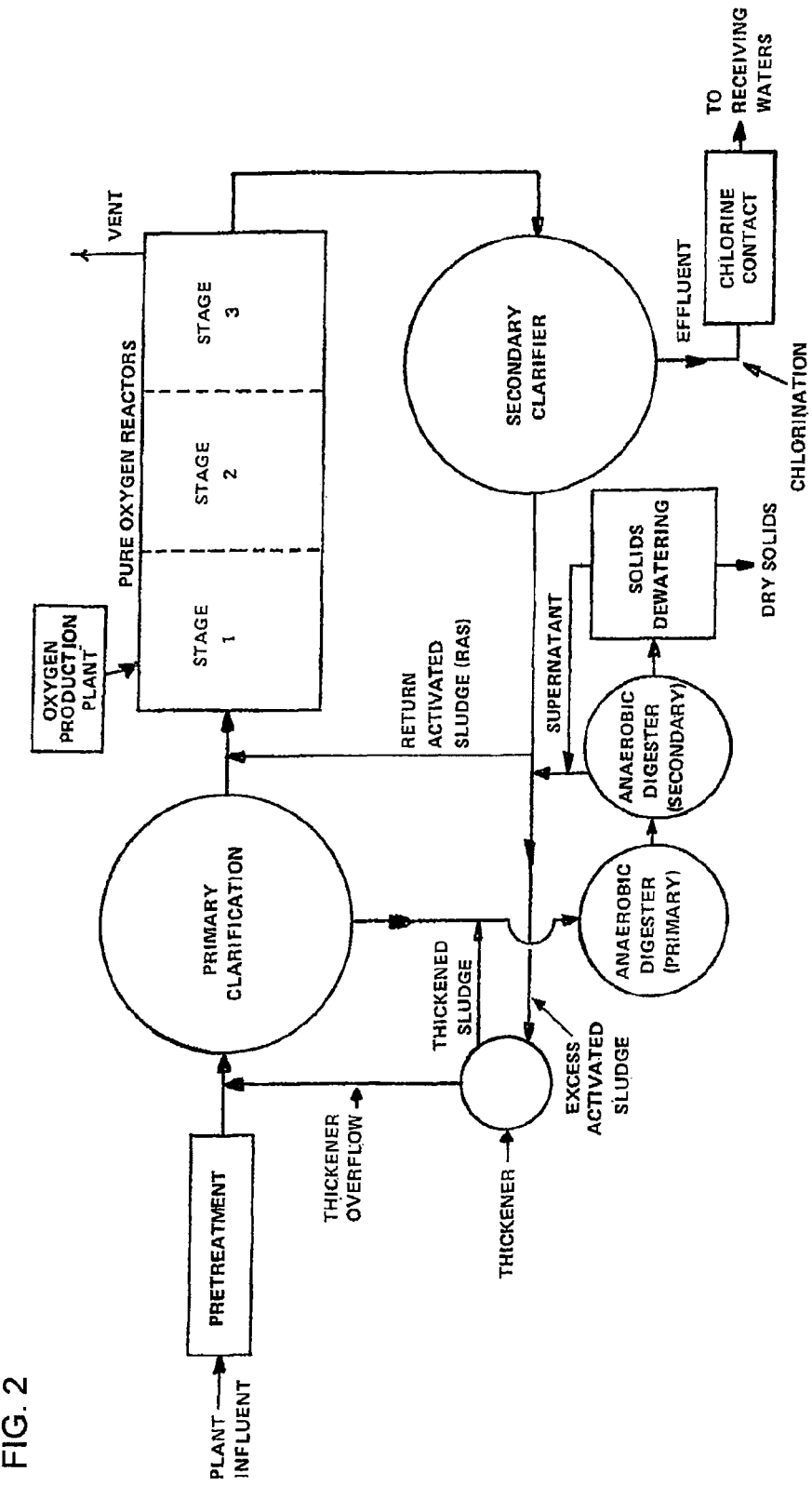
FIG. 2 is a diagram illustrating a conventional wastewater treatment process.

FIG. 2 illustrates another example of wastewater treatment process. Specifically, this is an example of a pure oxygen system. The pure oxygen system is a modification of the activated sludge process. The main difference is the method of supplying dissolved oxygen to the activated sludge. IN other activated sludge processes, air is compressed and released under water to produce an air-water interface that transfers oxygen into the water (dissolved oxygen). If compressed air is not used, surface aerators agitate the water surface to drive air into the water to obtain the oxygen transfer. In the pure oxygen system, the only real differences are that the pure oxygen rather than air is released below the surface or driven into the water by means of surface aerators and the aerators are covered. In this process the influent is subjected to primary clarification. As shown in FIG. 2, the influent is pretreated, then subjected to the primary clarifier, pure oxygen reactors, and a secondary clarifier. The effluent may be contacted with chlorine and disposed into the receiving waters. The sludge can be returned to the pure oxygen reactors or combined with the thickened sludge from the primary clarifier and subjected to primary and secondary anaerobic digester. Solids may then be dewatered.

Other wastewater treatment processes are known in the art and may be used according to the methods of this invention.

Methods of Treating Wastewater

In one embodiment, the invention is a method of treating wastewater, in which the net sludge wasted and/or produced in the method is reduced.

In the method of Biofermentation system, which was described in great detail in U.S. Pub. No. 2003/0190742, contents of which are incorporated herein in its entirety, is placed on-site at the wastewater treatment facility location.

The on-site system is for growing microbes at the site or location of the contaminated wastewater and generally, includes a main tank, an input for water, an output for a treatment batch, a mixing apparatus, and a temperature control apparatus. Nutrient, water and an inoculum comprising microbes is deposited into the on-site system. The inoculum is grown in the on-site system to provide a treatment batch that includes an increased number of the microbes. At least a portion of the treatment batch that includes microbes is then directly applied to the contaminated wastewater, such that the microbes are not isolated, concentrated or freeze dried between the steps of growing and applying. The microbes reduce the contaminants in the contaminated wastewater. On large activated sludge plants or single pass lagoons a holding tank may be used for transfer of the treatment batch where the treatment batch may be diluted to create greater volume for pumping and dosing purposes in order to achieve continuous discharge of the treatment batch.

Importantly, the use of the on-site biofermentation system allows for sufficient, repeated inoculation of the functional microbes (whether an exogenous or indigenous source) that allows a microbial population to be established quickly and out-compete an undesirable indigenous population, such as a filamentous or Zoogloeal type microbes, which cause bulking, which can increase the total costs of operating a wastewater treatment plant by as much as 20-25%. The first area of increased treatment costs arise because of the need to use settling aids or chemicals to clarify the water and concentrate the biomass in the secondary clarifier. Examples of such chemicals include polymer, bentonite, alum, or ferric salts. The second area of increased costs arise due to the poor dewaterability of filamentous and Zoogloeal growth, thereby increasing the amount of equipment required to process the sludge and the amount of polymer for the dewatering, and hence the costs. The third area of increased cost arise as more manpower is required as the operation becomes less efficient and the costs of transportation and fees for disposal increase. The biofermentation system provides a process which is applied to control or displace undesirable microbes, such as filamentous or Zoogloeal type microbes which cause bulking and settleability problems. The fermentation process is used to decrease or eliminate the use of polymers to enhance settling, to minimize the use of dewatering chemicals, and to minimize the need for sludge handling, manpower, transportation costs and fees for disposal.

Additionally, the biofermentation process allows for providing an effective concentration of desired microbes at a point of application sufficient to significantly treat the wastewater at the application point. Optimally, the inoculums is grown to a concentration of approximately $10^8$-$10^9$ colony forming units per milliliter (cfu/ml) to achieve a preferred minimum inoculation of approximately $10^3$-$10^4$ cfu/ml at the point of application.

The types of microbe or microbes present in the inoculums depend on the type of wastewater to be treated. The inoculums may contain a single strain or multiple strains of microbes depending on the wastewater problem being addressed. Inoculum may be provided as a liquid or a dry product. Dry product is commonly freeze dried or air dried. Additionally, the microbes may be exogenous to the wastewater or indigenous microbes may be isolated from the wastewater under treatment.

The terms microorganism, microbe, or organism, as used herein, are interchangeable and, include fungus, yeast, bacteria, and other biodegrading small unicellular organisms.

Preferably, sludge-reducing microorganisms, which can be purchased from Advanced Biofermentation Services Inc. of Fleming Island, Fla., are used for wastewater treatment at wastewater treatment facilities where the efficiency of BOD removal is low, the system is overloaded, and/or in any treatment facility to reduce operating costs related to sludge handling, which typically represents about 40-50% of the operating costs of any facility.

Some examples of microbes with particular biodegradation characteristics are provided in Table 1.

exposed to a test substrate compared to a control containing biomass and a known substrate which gives a predictable result. The substrate to be tested can range from a specific chemical or waste stream to a combined wastewater. Respirometry experiments can be set up to stimulate either aerobic or anaerobic environments. Typical applications of respirometry include assessing the following: treatability of municipal and industrial wastewater; toxicity of specific waste streams or chemicals; biodegradability of chemicals; biochemical oxygen demand (BOD); and oxygen uptake rates (OUR).

Aerobic microorganisms use oxygen to grow and to metabolize organic substrates. For aerobic microbes, oxygen uptake rate (OUR) is considered to be directly related to organic stabilization, and hence, related to the ability of the formulation to biodegrade the organic waste.

Respirometry equipment and treatability procedures for both aerobic and anaerobic studies can be obtained from manufacturers in the U.S. such as Challenge Environmental Systems in Fayetteville, Ark.; Arthur Technology of Fond du Lac, Wis.; and Bioscience Management of Bethlehem, Pa. Examples of aerobic treatability studies can be found in technical papers such as Whiteman, G. R., TAPPI Environmental Conference—"The Application of Selected Microbial Formulations in the Pulp and Paper Industry," TAPPI Environmental Proceedings, Book 1, pp. 235-238, April 1991; Whiteman, G. R., Gwinnett Industrial Conference—"Optimizing Biological Processes—A Look Inside The Black Box," April 1995; and Whiteman, G. R., TAPPI Environmental Conference—"Improving Treatment Performance with Natural Bioaugmentation", TAPPI Environmental Proceedings, Vancouver, BC, 1998; the disclosures of which are hereby incorporated by reference.

Once the effectiveness of each isolate, isolates, and/or formulation have been compared using respirometry techniques, then the best can be selected as the inoculums for the fermentation process described herein. Ready, prepared cultures can be purchased from Advanced Biofermentation Services Inc of Fleming Island, Fla.

The term "nutrients" refers to the substances which are required to support living plans and organisms. Major nutrients are carbon, hydrogen, oxygen, sulfur, nitrogen, and phosphorus. Nutrients include both macro-nutrients and micro-nutrients. The typical composition of a microbe is shown below in Table 2, in which it is apparent that different microbes have different compositions. Microbes also have different abilities to assimilate nitrogen into amino acids, the

TABLE 1

| Microbe | Respiration Type | Application Example | End Product Example |
|---|---|---|---|
| Pseudomonas putida | Aerobic | Phenol, toluene | Water, $CO_2$, biomass |
| Bacillus subtilis | Aerobic | Starch | Water, $CO_2$, biomass |
| Nocarida spp. | Aerobic | Cyclohexane | Water, $CO_2$, biomass |
| White Rot Fungus spp. | Aerobic | Chloro-organics | Water, $CO_2$, biomass |
| Nitrosomonas spp. | Aerobic | Ammonia oxidation | Nitrite |
| Nitrobacter spp. | Aerobic | Nitrite oxidation | Nitrate |
| Thiosphera pantotropha | Aerobic | Denitrification | Nitrogen gas |
| Methanogenic bacteria | Anaerobic | Acetic acid | Methane, $CO_2$, biomass |

Notes:
Spp. = species, these can vary; Subtilis is one species of Bacillus; Putida is one species of Pseudomonas; $CO_2$ = carbon dioxide.

Determining which culture or manufacturer's formulation is the most effective for treating a particular wastewater can be done using standard respirometric techniques. The principle of respirometry is to measure the activity of a biomass basic building blocks of proteins or the purine or pyrimidine bases of the ribonucleic acid (RNA) and deoxynucleic acid (DNA). Therefore, different microbes have different requirements for macronutrients (nitrogen and phosphorus) and micronutrients (for example magnesium, calcium, potassium, sodium, manganese, cobalt, nickel, zinc, iron, chloride and sulfur) to optimize the fermentation process. See Introductory Microbiology by Levy, et al., the disclosure of which is incorporated herein by reference, for information on macronutrients and micronutrients including concentrations for fastidious (hard to grow) microbes, how to determine whether a particular micronutrient is required, and explanations of the role of nutrients in general.

TABLE 2

| CONTENT | YEAST | BACTERIA | ZOOGLOEA |
|---|---|---|---|
| Carbon (C) | 47.0 | 47.7 | 44.9 |
| Hydrogen | 6.0 | 5.7 | — |
| Oxygen | 32.5 | 27.0 | — |
| Nitrogen (N) | 8.5 | 11.3 | 9.9 |
| Ash | 6.0 | 8.3 | — |
| Empirical formula | $C_{13}H_{20}N_2O_7$ | $C_5H_7NO$ | — |
| C:N ratio | 5.6:1 | 4.3:1 | 4.5:1 |

Active biomass, mainly composed of bacteria, in a biological treatment plant contains 8-15% nitrogen for most bacteria, most typically 12-12.5%, and 2-5% phosphorus, most typically 2.3-2.6%. Phosphorus is important in the formation of adenosine triphosphate (ATP) which is how microbes store energy.

Microbes are composed of proteins, carbohydrates, fatty materials called lipids, or combinations of these substances. In particular, the proteins are used to make enzymes that are the basis of the biodegradation process. A series of reactions makes up the biodegradation process for any particular organic substance. A specific enzyme carries out each reaction. These enzymes are composed of amino acids and sometimes co-factors, usually metals, which make up the reactive sites of the enzymes where the biodegradation and conversion of an organic substance stakes place. Optimally, micro-nutrients are present in sufficient quantity in order to optimize the fermentation or biodegradation process. Micro-nutrients include substances such as vitamins, co-enzymes, metals, or inorganic compounds required such as cofactors for the production of enzymes, coenzymes or for cell growth. For example, sulfur is required for the assimilation of the essential amino acids cysteine and methionine. Information regarding the role of such micronutrients such as coenzymes, including folic acid, pantothenic acid (Coenzyme A), vitamin $B_{12}$ (cabamide), biotin, nicotinic acid or nicotinamide (NAD), vitamin $B_1$ (thiamin), vitamin $B_2$ (riboflavin), vitamin $B_6$ (pyroxidine), lipoic acid and ascorbic acid is found in Biochemistry, Second Edition, Albert L. Lehninger, Wroth Publishers Inc., 1975, ISBN: 0-87901-047-9, and Introductory Microbiology by Levy, et al., John Wiley & Sons Inc., 1973, ISBN 0-471-53155-3, the disclosures of which are incorporated herein by reference.

As mentioned earlier, the type of microbe or microbes used in the wastewater treatment process of the present invention depends on the type of wastewater problem to be addressed. The microbes used most often are bacteria, and most commonly, aerobic, mesophilic bacteria are used. Aerobic bacteria use oxygen to metabolize organic matter, as measured, for example, by biochemical oxygen demand (BOD), chemical oxygen demand (COD), total organic carbon (TOC), or total carbon (TC). It is also possible to use facultative bacteria, which can metabolize with or without oxygen, anaerobic bacteria, which do not use oxygen. Bacteria are also classified with respect to the temperature at which they grow optimally.

Optimum temperatures are, for thermophiles—55-75° C.; for mesophiles—30-45° C.; and for psychrophiles: obligate—15-18° C.

The application or use such on-site biofermentation process and system results in a lower net sludge wastage and/or production for any wastewater treatment facility municipal or industrial.

A preferred wastewater treatment sequence and processes according to this invention are generally illustrated in FIGS. 3 and 4. The methods, however, are not limited to any particular system illustrated in the drawings or detailed above; any apparatus that enables performance of a method of the invention may be used instead.

Referring to FIG. 3, wastewater treatment according to the methods of this invention includes pretreatment, primary treatment (chemical and physical), secondary treatment (dissolved organics and suspended solids removal), tertiary treatment, sludge treatment, sludge disposal and liquid disposal.

The specific treatment steps of the wastewater treatment method of this invention are shown in FIG. 4.

The pretreatment step includes screening and grit removal, equalization and storage and oil separation. The chemical primary treatment includes at least 2 neutralization steps and chemical addition and coagulation. The physical primary treatment includes multiple flotation, sedimentation and filtration steps. The secondary treatment of dissolved organics includes activated sludge, anaerobic lagoon, trickling filter aerated lagoon, stabilization basin, rotating biological contractor, membrane bioreactor, sequencing batch reactor (SBR) and anaerobic contractor and filter. The suspended solid removal of the secondary treatment includes sedimentation of the solids or the internal aeration basin having a quiescent cycle (SBR) or use of membranes. Next, the wastewater undergoes the tertiary treatment which includes coagulation and sedimentation, filtration, carbon absorption, ion exchange and membrane. The sludge resulting from the treatment steps is then available for sludge treatment. Specifically, the sludge can be treated by digestion or wet combustion. The sludge can also be thickened (dewatered) by gravity or flotation to reduce the volumes transported off-site for disposal. Also, the sludge can be treated by pressure filtration, vacuum filtration, centrifugation or lagooning or drying beds. Following the sludge treatment, the sludge can be disposed by incineration, ocean disposal and landfill. The treated diluted wastewater can also be disposed into the receiving waters, controlled or transported discharge, ocean disposal, surface application or groundwater seepage, evaporation and incineration. The concentrated organic wastewater can be disposed by deep well injection or incineration.

Surprisingly, the wastewater treatment process that incorporates the on-site biofermentation system that utilizes sludge-reducing microbes of the present invention results in a lower net sludge wastage and/or production.

Specifically, typically, for every 1 pound (lb) of BOD treated by the secondary system, one would expect that 0.5 pounds (lbs) of sludge would be wasted and/or produced. Based on influent BOD loads and typical 90% BOD removal by most biological systems this would be equivalent to 0.45 lbs sludge produced per 1 lb (BD) entering the plan.

Biological sludge production rates vary for different wastewater constituents, for example fat, oil and/or grease (FOG) might produce 0.7-0.08 lbs sludge/lb of BOD reduced, while chemicals such as benzene or phenol could be as low as 0.25 lbs sludge/lb of BOD reduced.

However, when a Biofermentation system that uses as its treatment batch sludge-reducing microbes is installed on-site at the wastewater treatment facility, according to the methods of the present invention, for every 1 lb of BOD treated by the secondary system, 0.125 lbs of sludge are wasted and/or produced. Based on influent BOD loads and typical 90% BOD removal by most biological systems this would be equivalent to 0.112 pounds sludge produced per pound BOD entering the plan, which is significantly lower than one of ordinary skill in the art would expect based on the amount of the influent entering the treatment facility.

Without being bound by a particular mechanism, it is believed that the lower net sludge wastage and/or production may be attributed, for example to the increased number of microbes present in the system and available for biofermentation process as described in U.S. Pub. No. 2003/0190742. By increasing the number of viable microbes in the biological system this essentially reduces the F:M ratio, which means more viable microbes with less food to eat. In turn, this would result in cell metabolism of the microbes using BOD for cell maintenance rather than cell growth. The latter would therefore result in lower biological sludge production. In addition or alternatively, the benefit of reducing filamentous microbes (in activated sludge system) results in a better settling sludge allowing for more sludge to be carried in the biological system thereby decreasing F:M ratio and increasing SRT. This reduction in F:M and increase in SRT is a classical method of reducing net sludge wastage as more sludge auto-digests itself in the biological system resulting in lower net sludge wastage.

EXAMPLES

Example 1

City of Gray

The goal of this study was to improve treatment efficiency for BOD and hydraulic capacity at the activated sludge wastewater treatment facility at the City of Gray, as the conventional treatment system was often overloaded on a daily basis at design capacity.

Prior to the treatment, the City of Gray had a conventional package activated sludge system for wastewater treatment designed to treat 400,000 gallons per day (gpd) of municipal wastewater with an integrated aerobic digester and 4 drying beds Typically, sludge was wasted to the drying beds after the first 90-days as was normal practice prior to onset of winter.

A Model 250 Biofermentation, which can be purchased from Advanced Biofermentation Services, Fleming Island Fla. and installed as previously described in U.S. Pub. No. 2003/0190742, was set up on-site adjacent to the activated sludge system to be treated.

The Model 250 Biofermentor was set up to feed 30 gallons daily of a ¼ strength treatment batch, including BOD removing microbes with the trade name "Biobooster for BOD removal" which can be purchased from (Advanced Biofermentation Services, Fleming Island Fla.). A full strength treatment batch is defined as adding 10 pounds of Bionutrient (the nutrient used to grow the microbes) to the Biofermentor. As such, a ¼ strength treatment batch is equivalent to ¼ or 2.5 pounds. Bionutrient used in the process can be purchased from Advanced Biofermentation Services, Fleming Island Fla.

The Biofermentation process was initially set up for 90 days prior to winter. Within the 90 days of starting the treatment, significant improvements in the treatment process were observed by the operators, including improved hydraulic capacity without loss of TSS in the effluent during peak flows (sometimes greater than 1 MGD) and better BOD removal. Such observations were made visually and anecdotally from operators.

In the spring of the following year, surprisingly it was noticed that wasting sludge to the drying beds was not occurring and more attention was given to the sludge wasting process.

Several months later the City determined that there had been a 75% reduction in sludge production as determined by lack of use of the drying beds. The City had already started acquisition of a new belt press and building costing $800,000 to replace the drying beds. Had the City realized that Biofermentation could reduce sludge net wastage and/or production, then the City would not have approved the expenditure.

Importantly, the City of Gray noticed a 65% reduction in polymer usage and hydraulic capacity was increased by 50%. Also, any foaming problems/use of defoamer were eliminated. All these resulted in an improved wastewater treatment process.

Example 2

The City of Dublin's wastewater treatment plant (WWTP) has used Alum to precipitate suspended solids and the associated BOD out of the final effluent for the past eight (8) years. The plant is a 4.0 MGD trickling filter plant, with two traveling bridge sand filters at the end which produce reusable water. The WWTP has three permits:
(B1) 4 MGD, 30 BOD, 30 TSS
(B2) 4 MGD, 25 BOD, 15 TSS
(B3) 6 MGD, 25 BOD, 30 TSS In order to improve BOD removal, reduce alum usage in the secondary clarifiers used for clarification, and develop healthier biology to attain full potential of the process, Biofermentation process, as described herein was implemented at the City of Dublin WWTP.

Specifically, a Model 250 Biofermentation system, which can be purchased from Advanced Biofermentation Services, Fleming Island, Fla. and installed as previously described in U.S. Pub. No. 2003/0190742, was set up on-site adjacent to the percolating filter system. The Model 250 was set up to feed 60 gallons daily of a ¼ strength treatment batch using a specific culture developed for sludge reduction called "Biobooster for sludge reduction", which can be purchased from Advanced Biofermentation Services Inc, Fleming Island, Fla.

The treatment was run for 45 days.

After 45 days of using the Biofermentation process, the City was able to turn the Alum off saving the City about $100,000.

Also, algae growth on the trickling filter rocks was thriving, effluent BOD was reduced and TSS was meeting 85% removal without the use of alum. There was also a noticeable reduction in the biological sludge quantity, which resulted in going from running the press five days a week, yielding two containers per day (each 20 yard roll off), to running the press one or two times per week yielding one container per day (20 yard roll off).

The biofermentation system was then permanently installed.

Remarkably, after 6 months of operation the presses were being run once every two weeks. This represented a 70+% reduction in sludge handling costs. Digester sludge (including primary sludge and secondary sludge) also improved. Specifically, digester sludge changed from 1½% solids to 3% solids and cleaner supernatant from digesters.

Example 3

Prophetic

Method for Improving Anaerobic Sludge Digestion

Another application recognized from the surprising results at Dublin is the possibility of improving anaerobic sludge digestion.

For treatment of an anaerobic digester sludge, a Biofermentor (purchased from Advanced Biofermentation Services, Fleming Island, Fla.) is set up on-site of the digester to add a treatment batch directly to the digester. The dosing rate may vary based on volume of the digester. However, typically for less than 1 MGV digester, the dosing rate is 10-60 gallons per day of a ¼ to ½ strength batch.

To achieve faster rates of metabolism the dosing rates are doubled or quadrupled, as required to obtain the desired results.

The cost benefit to the customer is dependent on improving supernatant quality of the digester and thickness of the solids which would aid dewaterability and result in lower chemical/polymer costs for dewatering. Also, the operation costs would be due to less manpower and lower frequency of disposal. Furthermore, efficiency of such anaerobic digesters is improved, where digestion capacity is limited thereby avoiding capital expenditure or minimizing the need for expenditure.

Example 4

Prophetic

Method for Improving Sludge Digestion in an Equalization Basin

Another application recognized from the surprising results at Gray is the possibility of improving sludge digestion in the equalization basin, which are typically used by many smaller towns prior to treatment in a package plan. Also, expensive pretreatment and/or primary clarifiers may be avoided.

For treatment of equalization basin sludge a Biofermentor (purchased from Advanced Biofermentation Services, Fleming Island, Fla.) is set up on-site of the equalization basin to add a treatment batch directly to the equalization basin at the inlet to the wastewater plant.

The dosing rate would may based on volume of the equalization basin or incoming flow. However, typically, the volume of the incoming flow for less than 1-3 MGV would be 10-60 gallons per day of a ¼ to ½ strength batch. Scale-up for larger plants would be proportional. To achieve faster rates of metabolism the dosing rates could be doubled or quadrupled should that be required to obtain the desired results.

The cost benefit to the customer would be dependent on improving BOD removal across the equalization basin and reducing the solids build up avoiding or postponing the need to dredge solids. Dredging is extremely expensive as it incurs costs for dewatering equipment, chemical/polymer for dewatering, manpower, transportation and disposal fees. Furthermore, the treatment may result in improving efficiency of such equalization capacity where such capacity is limited thereby avoiding capital expenditure or minimizing the need for expenditure.

Example 5

Prophetic

Method for Reducing Primary Sludge in the Primary Clarifier Prior to the Anaerobic Digester Another application recognized from the surprising results at Dublin would be the possibility of reducing primary sludge in the primary clarifier prior to the anaerobic digester as the treatment of primary sludge is highly expensive.

For treatment of primary clarifier sludge a Biofermentor (purchased from Advanced Biofermentation Services, Fleming Island, Fla.) is set up on-site to add a treatment batch directly to the primary clarifier sludge at the inlet to the wastewater plant.

The dosing rate may vary based on volume treated by the wastewater treatment plan. However, typically, the volume treated by the wastewater plan of less than 1-3 MGV would be 10-60 gallons per day of a ¼ to ½ strength batch. Scale-up for larger plants would be proportional. To achieve faster rates of metabolism the dosing rates could be doubled or quadrupled should that be required to obtain the desired results.

The cost benefit to the customer would be dependent on reducing the sludge handling costs of the primary sludge such as the costs of dewatering equipment, chemical/polymer for dewatering, manpower, transportation, and disposal fees. Furthermore a second advantage would be improving efficiency of such sludge handling processes where such capacity is limited thereby avoiding capital expenditure or minimizing the need for expenditure.

All patents, patent applications, provisional applications, and publications referred to or cited herein are incorporated by reference in their entirety, including all figures and tables, to the extent they are not inconsistent with the explicit teachings of this specifications.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method of improving sludge removal and maintaining effluent quality, the method comprising:
   directing an incoming wastewater stream to a treatment facility, the stream having a flow of at least 20,000 gallons per day;
   the incoming wastewater stream having at least 50 mg/L solids and 100 mg/L: BOD;
   removing solids and BOD from the incoming wastewater stream in the treatment facility to provide a final effluent stream;
   the final effluent stream having less than 10% of the solids of the wastewater stream and less than 10% of the BOD of the wastewater stream; and
   the removal of solids and BOD yielding less than about 0.25 pounds of secondary sludge per pound of BOD removed.

2. The method of claim 1, wherein the incoming wastewater stream has at least about 100 mg/L solids and 200 mg/L BOD and the removed solid is less than about 0.25 pounds of secondary sludge per pound of BOD removed.

3. The method of claim 1, wherein the incoming wastewater stream has at least about 100 mg/L solids and 400 mg/L BOD and the removed solid is less than about 0.25 pounds secondary sludge per pound of BOD removed.

4. The method of claim 1, wherein the incoming wastewater stream has at least about 50 mg/L solids and 100 mg/L BOD and the removed solid is less than about 0.25 pounds of secondary sludge per pound of BOD removed.

5. The method of claim 1, wherein the incoming wastewater stream has at least about 100 mg/L solids and 200 mg/L BOD and the removed solid is less than about 0.125 pounds of secondary sludge per pound of BOD removed.

6. A method of improving sludge removal and maintaining effluent quality, the method comprising:
   directing an incoming wastewater stream to a treatment facility, the stream having a flow of at least 20,000 gallons per day;
   the incoming wastewater stream having at least 50 mg/L solids and 100 mg/L BOD;
   removing solids and BOD from the incoming wastewater stream in the treatment facility to provide a final effluent stream;
   the final effluent stream having less than 10% of the solids of the wastewater stream and less than 10% of the BOD of the wastewater stream;
   the removal of solids and BOD yielding less than about 0.25 pounds of biological sludge per pound of BOD removed.

7. The method of claim 6, wherein the incoming wastewater stream has at least about 100 mg/L solids and BOD yielding less than about 0.25 pounds of biological sludge per pound of BOD removed.

8. The method of claim 6, wherein the incoming wastewater stream has at least about 100 mg/L solids and 400 mg/L BOD and the removed solid is less than about 0.25 pounds of biological sludge per pound of BOD removed.

9. The method of claim 6, wherein the incoming wastewater stream has at least about 50 mg/L solids and 100 mg/L BOD and the removed solid is less than about 0.125 pounds of biological sludge per pound of BOD removed.

10. The method of claim 6, wherein the incoming wastewater stream has at least about 100 mg/L solids and 200 mg/L BOD and the removed solid is less than about 0.25 pounds of biological sludge per pound of BOD removed.

11. A method of improving sludge removal and maintaining effluent quality, the method comprising:
    the incoming wastewater having at least 50 mg/L solids and 100 mg/L BOD;
    removing solids from the incoming wastewater stream in the treatment facility to provide a first final effluent stream;
    the first effluent stream having less than 10% of the solids of the incoming wastewater stream and less than 10% of the BOD of the incoming wastewater stream;
    treating the wastewater stream by addition of a treatment batch from a biofermentor,
    whereby the pounds of sludge removed is reduced by at least about 10% without increasing the solids and BOD in the final effluent stream.

12. The method of claim 11, wherein the treatment batch is added to a primary clarifier.

13. The method of claim 11, whereby the pounds of sludge removed is reduced by at least about 25% without increasing the solids and BOD in the final effluent stream.

14. The method of claim 11, whereby the pounds of sludge removed is reduced by at least about 50% without increasing the solids and BOD in the final effluent stream.

15. A method of improving sludge removal and maintaining effluent quality, the method comprising:
    directing an incoming wastewater stream to a treatment facility, the stream having a flow of at least 20,000 gallons per day; and
    removing biological solids and BOD from the incoming wastewater stream in the treatment facility to provide a final effluent stream,
    wherein the final effluent stream having less than 10% of the biological solids of the wastewater stream and less than 10% of the BOD of the wastewater stream and
    wherein the removal of solids and BOD yielding less than about 0.25 pounds of biological solids per pound of BOD removed.

16. The method of claim 15, wherein the sludge comprises a primary sludge.

17. The method of claim 15, wherein the sludge comprises a primary sludge and a biological sludge.

18. The method of claim 15, wherein the incoming wastewater stream has at least about 100 mg/L solids and 200 mg/L BOD and the removed solid is less than about 0.25 pounds of biological solids per pound of BOD removed.

19. The method of claim 15, wherein the incoming wastewater stream has at least about 100 mg/L solids and 400 mg/L BOD and the removed solid is less than about 0.125 pounds of biological solids per pound of BOD removed.

20. The method of claim 15, wherein the incoming wastewater stream has at least about 50 mg/L solids and 100 mg/L BOD and the removed solid is less than about 0.125 pounds of biological solids per pound of BOD removed.

21. The method of claim 15, wherein the incoming wastewater stream has at least about 100 mg/L solids and 200 mg/L BOD and the removed solid is less than about 0.125 pounds of biological solids per pound of BOD removed.

22. A method of improving sludge removal and maintaining effluent quality, the method comprising:
    directing an incoming wastewater stream to the treatment facility, the stream having a flow of at least 20,000 gallons per day;
    the incoming wastewater stream having at least 50 mg/L solids or at least 100 mg/L BOD;
    removing solids and BOD from the incoming wastewater stream in a treatment facility to provide a final effluent stream;
    the final effluent stream having less than 10% of the solids of the wastewater stream and less than 10% of the BOD of the wastewater stream;
    the removal of solids and BOD yielding less than about 0.25 pounds of secondary sludge per pound of BOD removed.

23. The method of claim 22, wherein the incoming wastewater stream has at least about 100 mg/L solids and at least about 200 mg/L BOD and the removed solid is less than about 0.25 pounds of secondary sludge per pound of BOD removed.

24. The method of claim 22, wherein the incoming wastewater stream has at least about 100 mg/L solids and 400 mg/L BOD and the removed solid is less than about 0.25 pounds of secondary sludge per pound of BOD removed.

25. The method of claim 22, wherein the incoming wastewater stream has at least about 50 mg/L solids and 100 mg/L BOD and the removed solid is less than about 0.125 pounds of secondary sludge per pound of BOD removed.

26. The method of claim 22, wherein the incoming wastewater stream has at least about 100 mg/L solids and 200 mg/L BOD and the removed solid is less than about 0.125 pounds of secondary sludge per pound of BOD removed.

27. A method of improving sludge removal and maintaining effluent quality, the method comprising:

directing incoming wastewater stream to a treatment facility, the stream having a flow of at least 20,000 gallons per day;

the incoming wastewater stream having at least 50 mg/L solids or at least 100 mg/L BOD;

the final effluent stream having less than 10% of the solids of the wastewater stream and less than 10% of the BOD of the wastewater stream;

the removal of solids and BOD yielding less than about 0.25 pounds of biological sludge per pound of BOD removed.

28. The method of claim 27, wherein the incoming wastewater stream has at least about 100 mg/L solids and 200 mg/L BOD and the removed solid is less than about 0.25 pounds of biological sludge per pound of BOD removed.

29. The method of claim 27, wherein the incoming wastewater stream has at least about 100 mg/L solids and 400 mg/L BOD and the removed solid is less than about 0.25 pounds of biological sludge per pound of BOD removed.

30. The method of claim 27, wherein the incoming wastewater stream has at least about 50 mg/L solids and 100 mg/L BOD and the removed solid is less than about 0.125 pounds of biological sludge per pound of BOD removed.

31. The method of claim 27, wherein the incoming wastewater stream has at least about 100 mg/L solids and 200 mg/L BOD and the removed solid is less than about 0.125 pounds of biological sludge per pound of BOD removed.

32. A method of improving sludge removal and maintaining effluent quality, the method comprising:

directing an incoming wastewater stream to a treatment facility, the stream having a flow of a least 75708 liters (20,000 gallons) per day;

the incoming wastewater stream having at least 50 mg/L solids and 100 mg/L BOD;

removing solids and BOD from the incoming wastewater stream in the treatment facility to provide a final effluent stream;

wherein the step of removing solids and BOD comprises treating the wastewater stream by adding of the treatment batch including a functional microbe from a biofermentor and thereafter subjecting the wastewater stream to the biological waste treatment system using the functional microbe and the final effluent stream has less than 10% of the solids of the wastewater stream and less than 10% of the BOD of the wastewater stream;

wherein the addition of the treatment batch reduces the weight (pounds) of sludge removed is reduced by at least 10% without increasing the solids and BOD in the final effluent stream.

33. The method according to claim 32, wherein the weight (pounds) of sludge removed is reduced by at least 25% without increasing the solids and BOD in the final effluent stream.

34. The method according to claim 32, wherein the weight (pounds) of sludge removed is reduced by at least 50% without increasing the solids and BOD in the final effluent stream.

35. The method according to any preceding claims 32 to 34, wherein the removal of solids and BOD yields less than 0.25 kg of secondary sludge per kg of BOD removed.

36. The method according to any preceding claims 32 to 34, wherein the biofermentor is placed on-site at a wastewater treatment facility location.

37. The method according to claim 36, wherein nutrient, water and an inoculum comprising microbes is deposited into the on-site system.

38. The method according to claim 37, wherein the inoculum is grown to a concentration of $10^8$-$10^9$ colony forming units per milliliter (cfu/ml) to achieve a inoculation of $10^3$-$10^4$ cfu/ml at the point of application of the treatment batch.

39. The method according to any preceding claims 32 to 34, wherein the biofermentor includes a main tank, an input for water, an output for treatment batch, a mixing apparatus and a temperature control apparatus.

40. The method according to any preceding claims 32 to 34, wherein at least a portion of the treatment batch that includes microbes is directly applied to the contaminated wastewater, such that the microbes are not isolated, concentrated or freeze dried between the steps of growing and applying.

41. The method according to any preceding claims 32 to 34, wherein the treatment batch is added to an anaerobic digester.

42. The method according to any one of claims 32 to 40, wherein the treatment batch is added to an equalization basin.

43. The method according to any one of claims 32 to 40, wherein the treatment batch is added to a primary clarifier.

44. The method of any preceding claims 32 to 43, wherein the incoming wastewater stream has at least 100 mg/L solids and 200 mg/L BOD and the removed solid is less than 0.25 kg of secondary sludge per kg of BOD removed.

45. The method of any preceding claims 32 to 44, wherein the incoming wastewater stream has at least 100 mg/L solids and 400 mg/L BOD and the removed solid is less than 0.25 kg of secondary sludge per kg of BOD removed.

46. The method of any claims 32 to 44, wherein the incoming wastewater stream has at least 100 mg/L solids and 200 mg/L BOD and the removed solid is less than 0.125 kg of secondary sludge per kg of BOD removed.

* * * * *